(12) United States Patent
Yamashita et al.

(10) Patent No.: US 12,559,133 B2
(45) Date of Patent: Feb. 24, 2026

(54) MOBILE UNIT MANAGEMENT DEVICE, MANAGEMENT METHOD, AND STORAGE MEDIUM

(71) Applicant: KABUSHIKI KAISHA TOSHIBA, Tokyo (JP)

(72) Inventors: Michio Yamashita, Tokyo (JP); Hideyuki Aisu, Kawasaki (JP); Shizu Sakakibara, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 247 days.

(21) Appl. No.: 18/450,572

(22) Filed: Aug. 16, 2023

(65) Prior Publication Data

US 2024/0182066 A1 Jun. 6, 2024

(30) Foreign Application Priority Data

Dec. 6, 2022 (JP) ................................. 2022-194972

(51) Int. Cl.
*B60W 60/00* (2020.01)
*G06Q 10/083* (2023.01)

(52) U.S. Cl.
CPC ......... *B60W 60/001* (2020.02); *G06Q 10/083* (2013.01); *B60W 2556/10* (2020.02); *B60W 2556/30* (2020.02)

(58) Field of Classification Search
CPC ........... B60W 60/001; B60W 2556/10; B60W 2556/30; G06Q 10/083; G06Q 10/08; G06Q 10/0631; G06F 16/29; G06F 30/18
See application file for complete search history.

(56) References Cited

U.S. PATENT DOCUMENTS 7,920,962 B2 * 4/2011 D'Andrea .............. G01C 21/00
701/202
11,397,442 B2 7/2022 Aisu
(Continued)

FOREIGN PATENT DOCUMENTS

JP 2016-181177 A 10/2016
JP 2018-092264 A 6/2018
(Continued)

OTHER PUBLICATIONS

Hoang Tung Dinh, "Real-time safety assessment of trajectories for autonomous driving", 2021 (Year: 2021).*
(Continued)

*Primary Examiner* — Ramya P Burgess
*Assistant Examiner* — Brittany Renee Peko
(74) *Attorney, Agent, or Firm* — Oblon, McClelland, Maier & Neustadt, L.L.P.

(57) ABSTRACT

According to one embodiment, a mobile unit management device includes a processor with hardware, configured to generate an operation schedule of at least one mobile unit, control an operation of the mobile unit based on the operation schedule, upon a need arising for updating of the operation schedule, estimate a future position of the mobile unit based on an old operation schedule that has not yet been executed on the mobile unit, generate a new operation schedule based on the future position, integrate the old operation schedule and the new operation schedule into an integrated operation schedule, and control the operation of the mobile unit based on the integrated operation schedule.

9 Claims, 10 Drawing Sheets

(56)     References Cited

U.S. PATENT DOCUMENTS

| | | | |
|---|---|---|---|
| 11,468,770 B2 | 10/2022 | Yamashita et al. | |
| 11,586,221 B2 | 2/2023 | Aisu et al. | |
| 2014/0032035 A1* | 1/2014 | Thomson | G05D 1/0212 |
| | | | 701/25 |
| 2014/0100735 A1* | 4/2014 | Yoneda | G05D 1/0223 |
| | | | 701/25 |
| 2019/0227571 A1 | 7/2019 | Ito et al. | |
| 2020/0293063 A1* | 9/2020 | Aisu | G05D 1/0287 |
| 2021/0123766 A1 | 4/2021 | Yamashita et al. | |
| 2021/0132627 A1 | 5/2021 | Aisu et al. | |
| 2021/0286373 A1 | 9/2021 | Aisu et al. | |
| 2022/0019217 A1 | 1/2022 | Yamane et al. | |

FOREIGN PATENT DOCUMENTS

| | | |
|---|---|---|
| JP | 2020-149370 A | 9/2020 |
| JP | 2021-022289 A | 2/2021 |
| JP | 2021-071795 A | 5/2021 |
| JP | 2021-071796 A | 5/2021 |
| JP | 2021-071891 A | 5/2021 |
| JP | 2021-149216 A | 9/2021 |
| JP | 2022-018855 A | 1/2022 |

OTHER PUBLICATIONS

Japanese Office Action daled Oct. 28, 2025, issued in Japanese Patent Application No. 2022-194972 (with English translation; Documents 19-21 being ciled therein).

\* cited by examiner

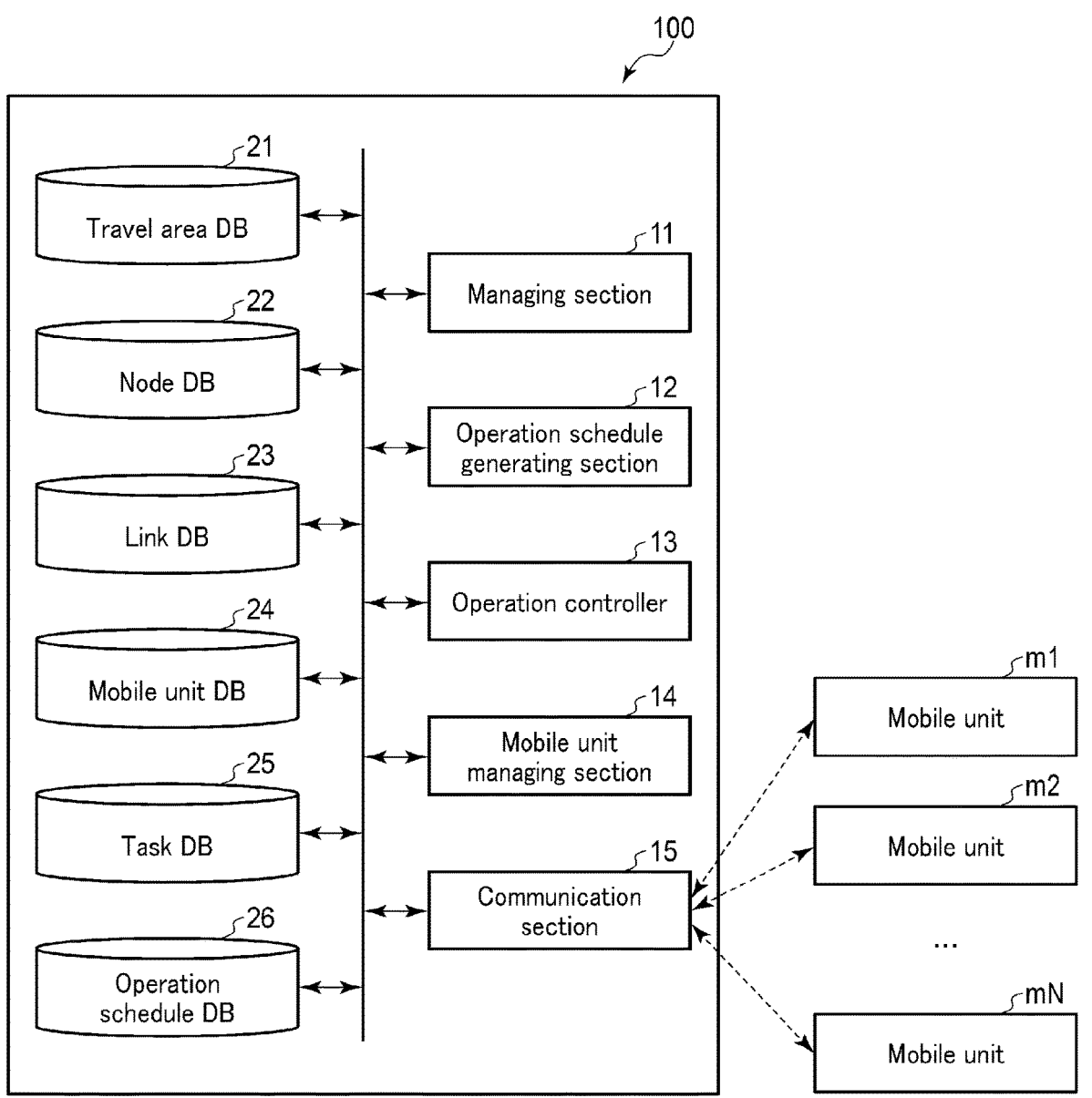
F I G. 1

| Node ID | X coordinate | Y coordinate |
|---------|-------------|-------------|
| n11 | x11 | y11 |
| n12 | x12 | y12 |
| n13 | x13 | y13 |
| n14 | x14 | y14 |
| n15 | x15 | y15 |
| n21 | x21 | y21 |
| ... | ... | ... |
| n55 | x55 | y55 |

F I G. 2

| Link ID | First node ID | Second node ID | Node directionality |
|---------|---------------|----------------|---------------------|
| l1 | n11 | n12 | Bidirectional |
| l2 | n11 | n21 | Bidirectional |
| l3 | n12 | n13 | Unidirectional |
| ... | ... | ... | ... |

F I G. 3

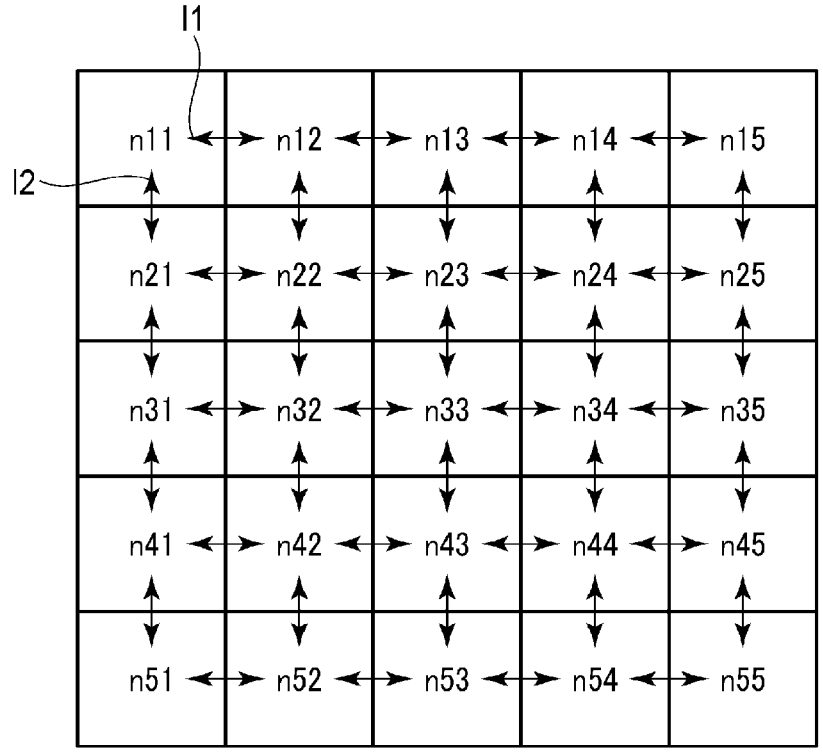
F I G. 4
| Task ID | Starting point | Arriving point | Status |
|---------|----------------|----------------|-----------------|
| 1 | n51 | n55 | Under execution |
| 2 | n11 | n55 | Unexecuted |
| ... | ... | ... | ... |
F I G. 5

| Operation schedule ID | Travel route | Time | Status |
|---|---|---|---|
| 1 | n41 | t1 | Completed |
| | n31 | t2 | Completed |
| | n21 | t3 | Completed |
| | n11 | t4 | Transmitted |
| | n12 | t5 | Transmitted |
| | n13 | t6 | Transmitted |
| | n23 | t7 | Not transmitted |
| | n33 | t8 | Not transmitted |
| | n43 | t9 | Not transmitted |
| | n53 | t10 | Not transmitted |
| | n54 | t11 | Not transmitted |
| | n55 | t12 | Not transmitted |
| 2 | ... | ... | ... |

FIG. 6

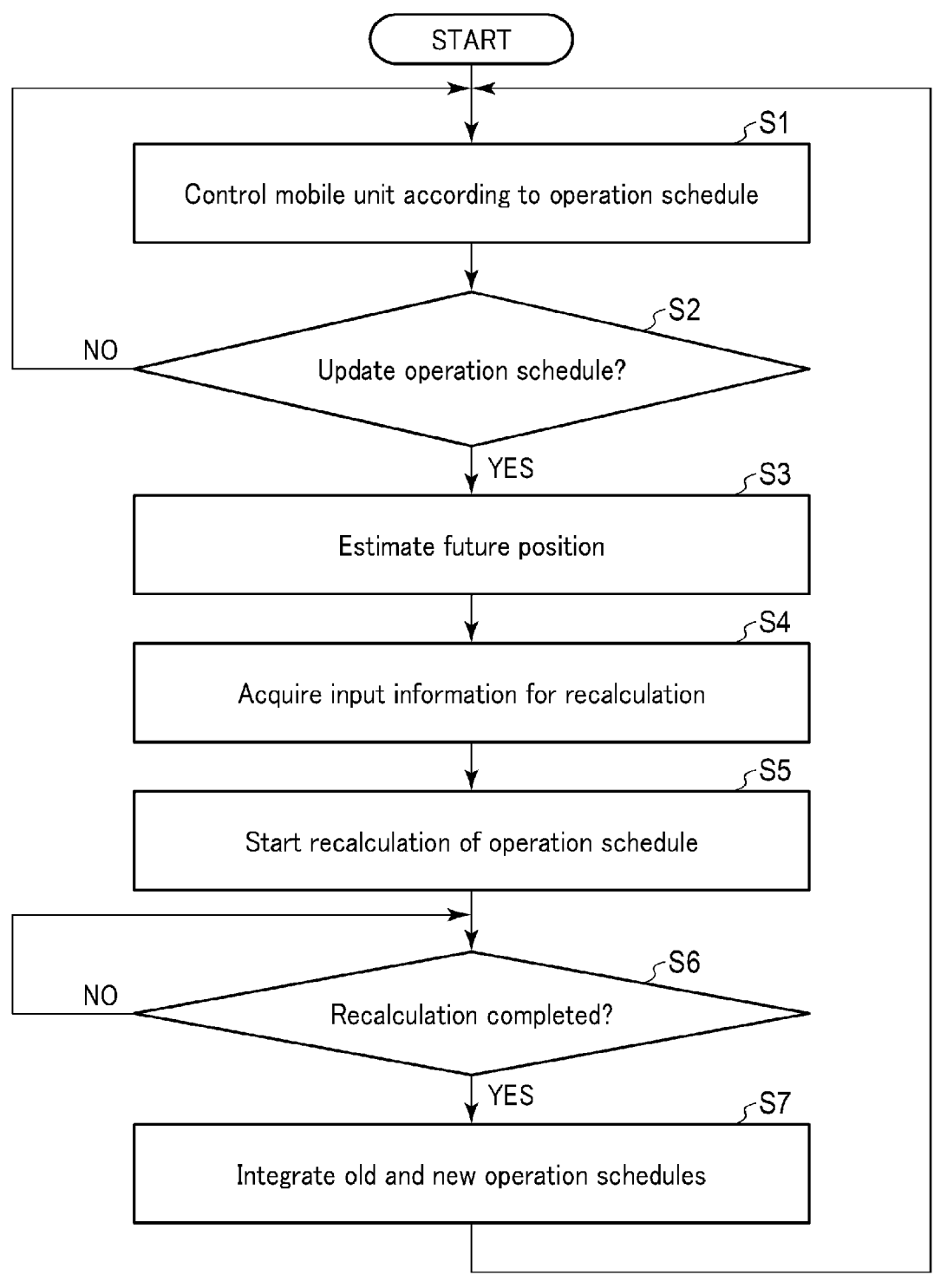
F I G. 7

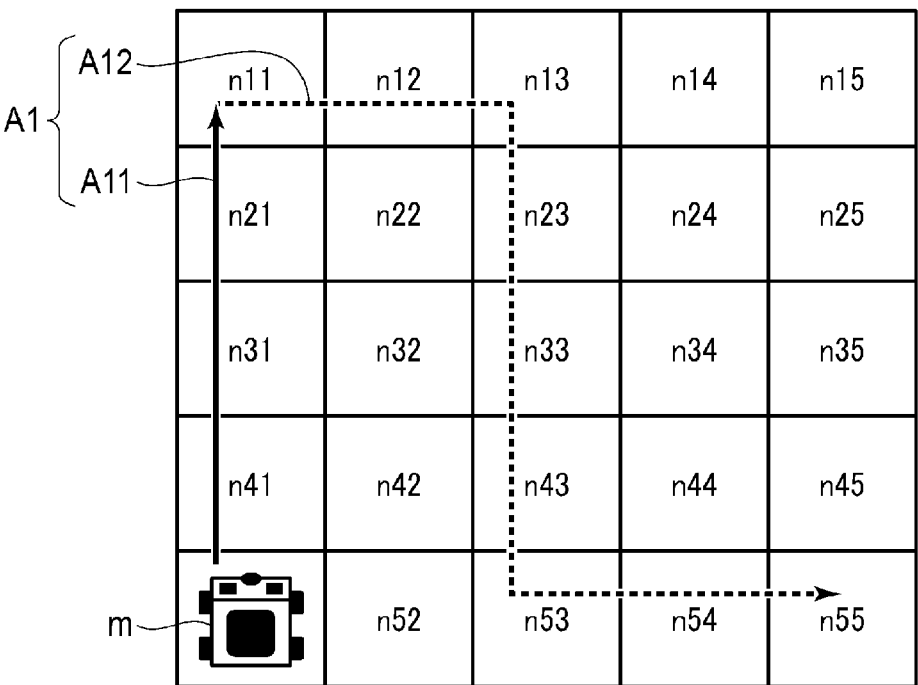
F I G. 8A
F I G. 8B

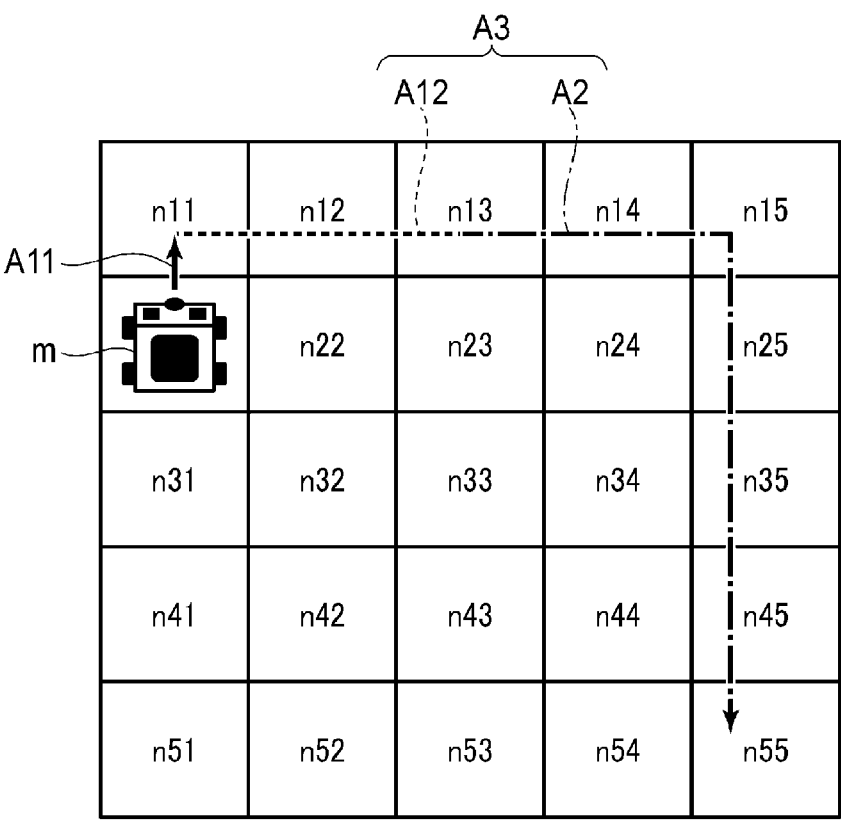
F I G. 8C
goto:n41 ⎤
goto:n31 ⎦ Transmitted
goto:n21 ⎤
goto:n11 ⎥
goto:n12 ⎥ Executable
goto:n13 ⎦
goto:n23
goto:n33
goto:n43
goto:n53
goto:n54
goto:n55
F I G. 9A

```
goto:n12 ⎤
goto:n13 ⎦  Not transmitted
goto:n14 ⎤
goto:n15 ⎥
goto:n25 ⎥
goto:n35 ⎥  Newly generated
goto:n45 ⎥
goto:n55 ⎦
```
F I G. 9B
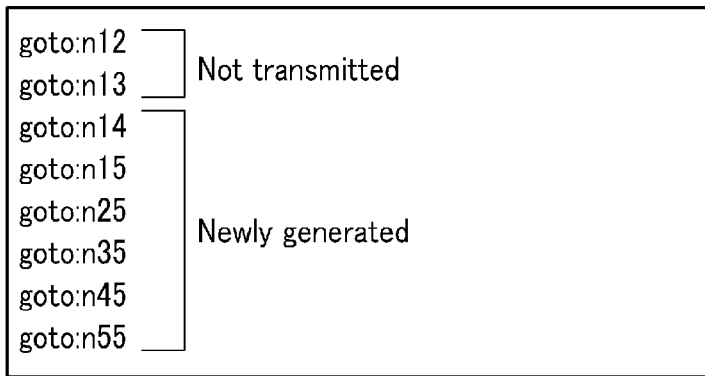
F I G. 10A

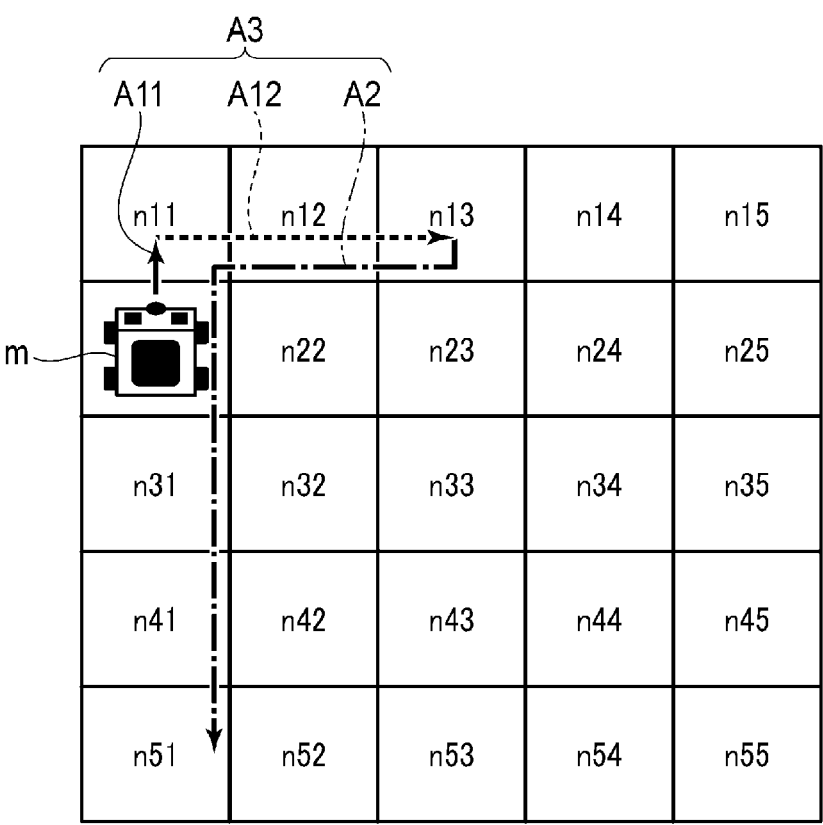
F I G. 10B
F I G. 10C

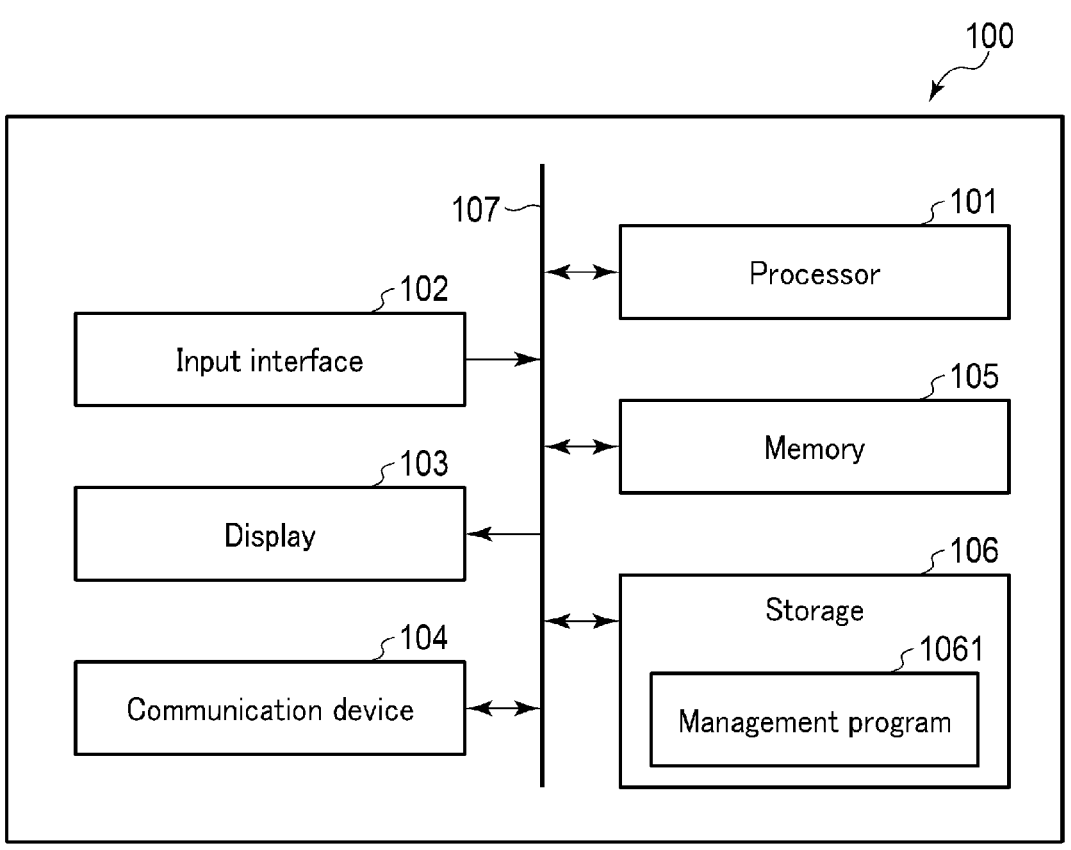
F I G. 11

MOBILE UNIT MANAGEMENT DEVICE, MANAGEMENT METHOD, AND STORAGE MEDIUM

CROSS-REFERENCE TO RELATED APPLICATION

This application is based upon and claims the benefit of priority from prior Japanese Patent Application No. 2022-194972, filed Dec. 6, 2022, the entire contents of which are incorporated herein by reference.

FIELD

Embodiments described herein relate generally to a mobile unit management device, management method, and storage medium.

BACKGROUND

As automatization advances in the field of logistics, mobile units such as automated guided vehicles (AGV) have been introduced into an unattended and efficient delivery operation. A mobile unit of this type carries items in accordance with a predetermined task. In a system in which multiple mobile units transport items at the same time, each of the mobile units operates in accordance with its own predetermined task. In order to avoid any collisions between the moving mobile units or conflict between tasks of the mobile units, an operation schedule needs to be created so that the operations of the mobile units can be managed in accordance with the created schedule.

The operation schedule may need to be updated when a new task is to be added, when a mobile unit completes a transport job, when there is a discrepancy between the operation schedule and the actual transport of the mobile unit, or when an abnormality arises. If a new operation schedule is created without stopping the mobile units, the new schedule cannot be used if there is a discrepancy between the original schedule and new schedule. However, if the mobile units are stopped during the creation of a new schedule, the efficiency of the mobile units will be considerably lowered.

According to the present embodiment, a management device, management method and storage medium for mobile units can be offered which can smoothly shift from an old operation schedule to a new one without causing any discrepancy problem.

BRIEF DESCRIPTION OF THE DRAWINGS

FIG. 1 is a block diagram of a mobile unit management device according to the present embodiment.

FIG. 2 is a diagram showing exemplary node information stored in a node database.

FIG. 3 is a diagram showing exemplary link information stored in a link database.

FIG. 4 is a diagram showing an exemplary travel path network determined based on the node information and link information.

FIG. 5 is a diagram showing exemplary task information stored in a task database.

FIG. 6 is a diagram showing exemplary information of operation schedules stored in a schedule database.

FIG. 7 is a flowchart showing the process procedure of the management device.

FIG. 8A is a diagram showing an integration of operation schedules.

FIG. 8B is a diagram showing an integration of operation schedules.

FIG. 8C is a diagram showing an integration of operation schedules.

FIG. 9A is a diagram showing exemplary control commands generated by the operation controller based on the old operation schedule.

FIG. 9B is a diagram showing exemplary control commands generated by the operation controller based on an integrated operation schedule.

FIG. 10A is a diagram showing an integration of operation schedules according to the first modification example.

FIG. 10B is a diagram showing an integration of operation schedules according to the first modification example.

FIG. 10C is a diagram showing an integration of operation schedules according to the first modification example.

FIG. 11 is a diagram showing an exemplary hardware structure of the management device.

DETAILED DESCRIPTION

In general, according to one embodiment, a mobile unit management device includes a processor with hardware, configured to generate an operation schedule of at least one mobile unit, control an operation of the mobile unit based on the operation schedule, upon a need arising for updating of the operation schedule, estimate a future position of the mobile unit based on an old operation schedule that has not yet been executed on the mobile unit, generate a new operation schedule based on the future position, integrate the old operation schedule and the new operation schedule into an integrated operation schedule, and control the operation of the mobile unit based on the integrated operation schedule.

The present embodiment will be described below with reference to the accompanying drawings. FIG. 1 is a block diagram of a mobile unit management device according to the present embodiment. A management device 100 is a computer that manages the operations of the number N (where N is a natural number) of mobile units m1, m2, . . . , and mN. Each of the mobile units m1 to mN is an autonomous mobile unit such as an AGV, an autonomous mobile robot, or an automatic driving vehicle, operating in accordance with control commands generated by the management device 100. The mobile units m1 to mN may move around in a facility such as a factory or warehouse. The mobile units m1 to mN may be equipped with a battery so as to be driven in the travel area of the facility with power supplied from the battery. The mobile units m1 to mN may be configured to drive in the facility with an item loaded from shelves or the like. The mobile units m1 to mN may be further configured to autonomously load and unload items, or the loading and unloading may be human-powered.

The management device 100 includes a managing section 11, an operation schedule generating section 12, an operation controller 13, a mobile unit managing section 14, and a communication section 15. The management device 100 further includes a travel area database (DB) 21, a node DB 22, a link DB 23, a mobile unit DB 24, a task DB 25, and an operation schedule DB 26. The travel area DB 21, node DB 22, link DB 23, mobile unit DB 24, task DB 25, and operation schedule DB 26 may be stored in a storage provided separately from the management device 100.

The travel area DB 21 is a database in which information of the travel area is stored. The information of the travel area may include map data of the facility such as a factory or warehouse, in which the travel area of mobile units is defined. The travel area includes coordinate information, and the positions of shelves and the like in the facility and the positions of temporarily placed objects are associated with coordinates defined in the travel area. The map data may be drawing data that has been predefined by a computer aided design (CAD) or the like. Alternatively, if a mobile unit is provided with a function of creating an environmental map based on its self-location detection function, the map data may be the data of the self-created environmental map.

The node DB 22 and link DB 23 are databases in which information relating to the travel path network is stored. The travel path network includes travel paths of mobile units having a network structure, and the travel paths are defined in association with the travel areas. The travel path network contains nodes and links, where a node represents a target position of a mobile unit, which is associated with the coordinates of the travel area, and a link represents a connection between nodes.

FIG. 2 shows an example of the node information stored in the node DB 22. The node information includes information of node IDs, X coordinates, and Y coordinates. A node ID is uniquely assigned to each node to identify this node. The X coordinate is the X coordinate of the position of a node having a certain node ID on the map data, and the Y coordinate is the Y coordinate of this node.

FIG. 3 shows an example of the link information stored in the link DB 23. The link information includes information of link IDs, first node IDs, second node IDs, and node directionality. A link ID is uniquely assigned to each link to identify this link. The first node ID is the node ID of a starting node of a link having a certain link ID, and the second node ID is the node ID of a destination node of this link. The node directionality represents whether a move between any two nodes is bidirectional or is limited to a unidirectional move. If a bidirectional move is allowed, a mobile unit can move from a starting node to a destination node, or from the destination node to the starting node. If only a unidirectional move is allowed, the mobile unit can move only from the starting node to the destination node.

FIG. 4 shows an exemplary travel path network determined based on the node information and link information. In the example of FIG. 4, the travel path network is formed by 25 nodes and 40 bidirectional links. The number of nodes and the number of links are suitably determined in accordance with the size of the travel area and the like. In FIG. 4, the nodes are positioned in contact with each other, but the nodes do not always need to be in contact with each other. A link does not always need to be provided between adjacent nodes. The nodes in FIG. 4 are shaped into a square, but do not always need to be squares.

The mobile unit DB 24 is a database in which information of each of the mobile units m1 to mN is stored. The mobile unit information includes the real-time positions of the mobile units. These positions may include, for example, the positions of waiting areas of the mobile units. The positions of the mobile units may be obtained from the data received from the mobile units at predetermined intervals. Alternatively, the positions of the mobile units may be obtained from sensors provided in the travel area. If this is the case, the sensor may be provided at each node so that, upon detection of a mobile unit passing this node, the sensor will inform the management device 100 of this detection. The mobile unit information stored in the mobile unit DB 24 may include information other than positional information. For instance, the mobile unit information may include their remaining battery levels. If the mobile units are configured to transport items, the mobile unit information may include information regarding whether an item is being carried, and if so, information of the type and number of items that are being transported. The mobile unit information may further include information relating to the specifications of each mobile unit, which may include the standard speed, maximum speed, minimum speed, dimensions, possible driving directions, and the like. If the mobile unit is configured to load and unload items, the mobile unit information may include information relating to periods of time required for such jobs.

The task DB 25 is a database in which the task information is stored. The task information represents tasks assigned to each mobile unit. The tasks may be entered by an operator of the management device 100. FIG. 5 shows an example of the task information stored in the task DB 25. The task information may include information of task IDs, starting points, arriving points, and status. A task ID is assigned to each task. The starting point is the node ID of a node at the starting point of a mobile unit. If the mobile unit having the assigned task is not located at the starting point when the task is to be initiated, this mobile unit is controlled to move to the starting point. The arriving point is the node ID of, for example, a station at the arriving point of the mobile unit. The status indicates the information of the current status of a task in progress. The current status of the task may include "unexecuted", "under execution", and "completed", where "unexecuted" indicates that the task has not yet been executed; "under execution" indicating that the task is now being carried out; and "completed" indicating that the task has been completed. The status of the task does not need to include "completed". In this case, the task, when it is completed, may be deleted from the task DB 25. The task information may further include route information in addition to the starting point and arriving point. The route information indicates a node ID of a point that a mobile unit will pass under execution of the task. The task information may also include information of loading and unloading jobs and the like to be carried out at the starting point, arriving point, and in-between points, depending on the configuration of the mobile units.

The operation schedule DB 26 is a database in which the operation schedule information generated by the operation schedule generating section 12 is stored. The operation schedule indicates how a mobile unit should be operated in order to complete a task. FIG. 6 shows an example of the operation schedule information stored in the operation schedule DB 26. The operation schedule information includes information of operation schedule IDs, travel routes, times, and statuses. An operation schedule ID is assigned to each operation schedule. A travel route indicates a node ID of a point that a mobile unit passes in the operation schedule. A time indicates a scheduled time at which the mobile unit passes the point. The status indicates the current status of the operation schedule. The status of the operation schedule may include "completed", "transmitted", and "not transmitted", where "completed" indicates that the operation schedule is already completed; "transmitted" indicates that a control command has been transmitted to the mobile unit of the operation schedule, although the operation of the mobile unit has not yet been completed; and "not transmitted" indicates that a control command has not yet been transmitted to the mobile unit of the operation schedule.

The managing section 11 controls the operation of each of the operation schedule generating section 12, operation controller 13, mobile unit managing section 14, and communication section 15. The managing section 11 may instruct the operation schedule generating section 12 to generate an operation schedule. The managing section 11 further instructs the operation controller 13 to obtain the operation schedule generated by the operation schedule generating section 12 from the operation schedule DB 26 and control the operations of the mobile units m1 to mN in accordance with this operation schedule. If updating of the operation schedule becomes necessary during the operations of the mobile units m1 to mN, the managing section 11 instructs the operation schedule generating section 12 to update the schedule. The managing section 11 integrates the old and new operation schedules generated by the operation schedule generating section 12, and instructs the operation controller 13 to control the operations of the mobile units m1 to mN in accordance with the integrated operation schedule. The operation of the managing section 11 will be described in detail later.

The operation schedule generating section 12 generates an operation schedule for each of the mobile units m1 to mN, based on the travel area information stored in the travel area DB 21, node DB 22, and link DB 23, the mobile unit information regarding the mobile units m1 to mN stored in the mobile unit DB 24, and the task information stored in the task DB 25. Then, the operation schedule generating section 12 stores the generated operation schedule in the operation schedule DB 26. The operation schedules can be generated with any method. For instance, if operation schedules for multiple mobile units need to be simultaneously generated, the operation schedule for each mobile unit may be generated in such a manner that the total travel amount of each mobile unit can be minimized, while preventing the mobile units from colliding with each other.

Upon receipt of an instruction issued by the managing section 11, the operation controller 13 obtains the operation schedule of each mobile unit from the operation schedule DB 26, and generates a control command for the mobile unit based on the obtained operation schedule. The control command includes a command for realizing travel to a node of the destination point entered in the operation schedule. The command for realizing the travel may include information of a node ID, a speed, and the like. If the initial position of the mobile unit does not coincide with the starting point, the travel command may include a command for driving the mobile unit to the node of the starting point. Furthermore, if the mobile units are configured to carry out loading and unloading, the control command may include a command for performing such a job at destination coordinates or a node. This command includes information of descriptions of the operation.

The mobile unit managing section 14 manages the state of each mobile unit. For instance, the mobile unit managing section 14 obtains the current positions detected by the sensors of the mobile units m1 to mN by way of the communication section 15, and updates the current position of each mobile unit stored in the mobile unit DB 24 based on the corresponding one of the obtained current positions. Furthermore, the mobile unit managing section 14 may obtain the remaining battery levels of the mobile units m1 to mN by way of the communication section 15, and update the remaining battery level of each mobile unit stored in the mobile unit DB 24 based on the corresponding one of the obtained levels.

The communication section 15 conducts communications between the management device 100 and the mobile units m1 to mN. The communication section 15 may establish wireless communications between the management device 100 and mobile units m1 to mN.

Next, the operations of the management device 100 will be described. FIG. 7 is a flowchart showing the operations of the management device 100. In the description of FIG. 7, it is assumed that operation schedules generated by the operation schedule generating section 12 are stored in the operation schedule DB 26.

At step S1, the managing section 11 of the management device 100 obtains an operation schedule for each mobile unit from the operation schedule DB 26. The managing section 11 causes the operation controller 13 to initiate the control of the operation of each mobile unit in accordance with the corresponding one of the obtained operation schedules. The operation controller 13 generates a control command for the mobile unit based on the operation schedule. Then, the operation controller 13 repeats transmission of a certain number of control commands to the mobile unit by use of the communication section 15 so as to control the operation of the mobile unit, where the number of control commands that can be transmitted at a time is predetermined.

At step S2, the managing section 11 determines whether the operation schedule needs to be updated. An operation schedule is determined to be updated, for example when a new task is added, when the operation of the mobile unit is completed, when a discrepancy is found between the operation schedule and the actual operation of the mobile unit, or when an abnormality occurs. A task may be entered by an operator of the management device 100. The completion of the operation of the mobile unit may be obtained from the information of the status information stored in the task DB 25. A discrepancy between the operation schedule and the actual operation of the mobile unit may be found by comparing the mobile unit information stored in the mobile unit DB 24 with the information stored in the operation schedule DB 26. An abnormality may be detected from the mobile unit information or the like stored in the mobile unit DB 24. If it is determined at step S2 that the updating of the operation schedule is not necessary, the process returns to step S1. In this case, the control of the operation of the mobile unit continues based on the current operation schedule. If it is determined at step S2 that updating of the operation schedule is necessary, the process proceeds to step S3. According to the present embodiment, it is assumed that even if the updating of the operation schedule is determined, the operation of the mobile unit continues to be executed based on the old operation schedule until the mobile unit reaches the future position, which will be described later.

At step S3, the managing section 11 estimates the future position of each of the mobile units that are being operated. The future position indicates a position at which the mobile unit will be located when the updating of the operation schedule is completed. In other words, the future position may be determined in accordance with the period of time required for recalculation of the operation schedule. The calculation time of the operation schedule may vary in accordance with the number of mobile units, the number of tasks, and the number of candidate arriving points. The calculation times required for the calculation of an operation schedule may be measured in advance by varying conditions and stored in the operation schedule DB 26 so that the managing section 11 can estimate the time for calculation, based on the number of mobile units, the number of tasks, the number of candidate arriving points and the like at the time of recalculation of the operation schedule. The managing section 11 estimates the future position of each mobile unit from the estimated calculation time. The future position can be calculated from the product of the speed of the mobile unit and the calculation time. The estimation of the future position, however, is not limited to this method. For instance, the future position may be estimated by adding some margin to the calculation time. This margin may include a length of time required for integration of old and new operation schedules, which will be discussed later, and a length of time required for transmission of a control command based on the integrated operation schedule.

At step S4, the managing section 11 acquires input information required for recalculation of the operation schedule. According to the present embodiment, the operation schedule is recalculated from the future position. The input information therefore includes the future positions of the mobile units.

At step S5, the managing section 11 causes the operation schedule generating section 12 to initiate the recalculation of the operation schedule. Upon completion of the recalculation of the operation schedule, the operation schedule generating section 12 reports the completion to the managing section 11. The managing section 11 may inform the user of the management device 100 that the operation schedule is being recalculated. Such information can be provided with any method, for example through display of the information.

At step S6, the managing section 11 determines whether or not the recalculation of the operation schedule is completed. The process is suspended at step S6 until the determination is made that the recalculation is completed. As mentioned earlier, the mobile unit continues to be driven based on the old non-updated operation schedule until its arrival at the future position, according to the present embodiment. If it is determined at step S6 that the recalculation of the operation schedule is completed, the process proceeds to step S7.

At step S7, the managing section 11 integrates the old and new operation schedules and stores the integrated operation schedule in the operation schedule DB 26. Thereafter, the process returns to step S1. After the operation schedules are integrated at step S7, the operation of the mobile unit is controlled in accordance with the integrated operation schedule.

The integration of the operation schedules will be further described. FIGS. 8A to 8C are diagrams showing an integration of operation schedules.

FIG. 8A conceptually describes the control of the operation of a mobile unit in accordance with an old operation schedule. The control of the operation of a mobile unit m will be discussed with reference to FIG. 8A. In actuality, multiple mobile units may be simultaneously operated.

In the example of FIG. 8A, in which the node n51 serves as a starting point, the mobile unit m starts its operation in accordance with an operation schedule A1. The operation schedule A1 of FIG. 8A is divided into an operation schedule A11 and an operation schedule A12. The operation schedule A11 corresponds to control commands that have already been transmitted to the mobile unit m, or in other words the control commands that are currently being executed at the mobile unit m. The operation schedule A12 corresponds to control commands that are not yet transmitted to the mobile unit.

If it is determined during the implementation of the operation schedule A11 that the operation schedule needs to be updated, the future position of the mobile unit m is estimated. The future position can be estimated as a position where the mobile unit m will be located after proceeding from the current position for a length of time required for the recalculation of the operation schedule. In the example of FIG. 8A, the node n13 will be the future position. The new operation schedule is therefore calculated by using the future position node n13 as input information. For instance, a new operation schedule indicated by arrow A2 of FIG. 8B is obtained. At the completion of the calculation of this new operation schedule, the mobile unit m is in the process of moving to the future position of the node n13.

After the completion of the calculation of the new operation schedule, the managing section 11 integrates the old operation schedule A1 with the new operation schedule A2. In particular, the managing section 11 integrates the new and old operation schedules by adopting the old operation schedule A1 up to the future position and the new operation schedule A2 after the future position. The integrated operation schedule A3 is illustrated in FIG. 8C. As illustrated in this drawing, the integrated operation schedule A3 includes the not-yet-executed old operation schedule A12 up to the future position and the new operation schedule A2.

Next, the control of the operation of the mobile unit m before and after the operation schedule updating will be described. As mentioned earlier, the operation controller 13 transmits a certain number of control commands generated based on the operation schedule to the mobile unit m by use of the communication section 15, where the number of control commands that can be transmitted at a time of transmission is predetermined. FIG. 9A is a diagram showing exemplary control commands generated by the operation controller 13 based on the old operation schedule. Among the control commands listed in FIG. 9A, control commands up to the one for moving the mobile unit m to the node n31 have already been transmitted to the mobile unit m. Based on the received control commands, the mobile unit m carries out the move up to the node n31.

During the move of the mobile unit m to the node n31, it is determined that the operation schedule needs to be updated. Here, the managing section 11 estimates the future position based on the length of time required for the recalculation of the operation schedule. If the future position is estimated as node n13, the operation schedule generating section 12 generates an operation schedule after the node n13. Then, the managing section 11 integrates the new and old operation schedules. As indicated in FIG. 9A, the control commands up to the node n13 future position are executable.

The operation controller 13 regenerates control commands based on the integrated operation schedule. FIG. 9B is a diagram showing exemplary control commands generated by the operation controller 13 based on the integrated operation schedule. In this example, among the executable control commands generated based on the old operation schedule, the control command for a move to the node n12 and the control command for a move to the node n13 future position have not yet been transmitted. Thus, while maintaining the control commands for the move to the node n12 and the move to the node n13, the operation controller 13 updates all the other control commands to the control commands newly generated based on the new operation schedule.

As discussed above, according to the present embodiment, if the necessity for updating the operation schedule arises during the control of the operation of the mobile unit, the old and new operation schedules are integrated, and control commands are generated based on the integrated operation schedule. As a result, no inconsistency problem will occur between the old and new operation schedules. Furthermore, the future position, which serves as a reference of the integration of the old and new operation schedules, is determined in accordance with the length of time required for the recalculation of the operation schedule. The mobile unit therefore does not need to be stopped when changing from the operation schedule to the new operation schedule, and a transition from the old operation schedule to the new operation schedule can be smoothly conducted without inconsistency.

Modification Example 1

Some modification examples of the embodiment will be described below. According to the embodiment, the old and new operation schedules are integrated in such a manner as to include a future position. This is to make a smooth transition from the old operation schedule to the new one without stopping the mobile unit. If the transition becomes smoother by stopping the mobile unit rather than moving the mobile unit to the future position, the integrated operation schedule does not always need to include the future position. Whether or not to include the future position in the integrated operation schedule can be determined by the managing section 11.

For instance, with respect to the old operation schedule of FIG. 8A, a new operation schedule is generated to return the mobile unit m from the current position to the previously passed node, as indicated in FIG. 10A. In this case, as illustrated in FIG. 10B, an integrated operation schedule A3 may be generated such that, after moving the mobile unit m to the future position based on the not-yet-executed part of the old operation schedule, the mobile unit m will make a U-turn based on the new operation schedule. Alternatively, as illustrated in FIG. 10C, the integrated operation schedule A4 may be generated such that the mobile unit m will not be moved to the future position.

Modification Example 2

According to the present embodiment, a predetermined number of control commands are transmitted at a time to the mobile unit. However, if control commands of the same type are to be sequentially transmitted, for example, to keep the mobile unit moving straight forward, control commands of a number larger than the predetermined number may be allowed to be transmitted to the mobile unit. On the other hand, even if the number of control commands to be transmitted is predetermined, in the case where a future position is included, only the number of control commands necessary to move the mobile unit up to the future position may be transmitted.

Modification Example 3

According to the embodiment, it is assumed that a new operation schedule is successfully generated. The generation of a new operation schedule, however, may not turn out to be successful. If this is the case, the old operation schedule may be used.

Next, an exemplary hardware structure of the management device 100 will be described below. FIG. 11 is a diagram showing an exemplary hardware structure of the management device 100. As illustrated in this drawing, the management device 100 is a computer that includes a processor 101, an input interface 102, a display 103, a communication device 104, a memory 105, and a storage 106. The processor 101, input interface 102, display 103, communication device 104, memory 105, and storage 106 are connected by a bus 107.

The processor 101 controls the entire sequence of operations of the management device 100. Upon execution of a management program 1061 stored in the storage 106, the processor 101 functions as a managing section 11, an operation schedule generating section 12, an operation controller 13, a mobile unit managing section 14, and a communication section 15. The processor 101 may be a CPU. Alternatively, it may be an MPU, a GPU, an ASIC, an FPGA, or the like. The processor 101 may be a single CPU, or multiple CPUs.

The input interface 102 includes input devices such as a touch panel, a keyboard, a mouse, and the like. When an entry is made on the input device, a signal corresponding to this entry is input to the processor 101 by way of the bus 107. The processor 101 performs various types of processing in accordance with this signal.

The display 103 may be a liquid crystal display, an organic EL display, or the like. The display 103 may be used to inform the user of the management device 100 that an operation schedule is currently being calculated.

The communication device 104 allows the management device 100 to communicate with external devices. The communication device 104 functions as the communication section 15 together with the processor 101. The external devices include mobile units. The communication device 104 may be designed to establish wired communications or wireless communications.

The memory 105 includes a ROM and a RAM. A ROM is a nonvolatile memory, and stores therein a start-up program for the management device 100 and the like. A RAM is a volatile memory, and is used, for example, as a working memory during the processing of the processor 101.

The storage 106 may be a hard disk drive or a solid state drive, and stores therein various programs to be executed by the processor 101, including the management program 1061. The storage 106 may include the travel area DB 21, node DB 22, link DB 23, mobile unit DB 24, task DB 25, and operation schedule DB 26. Alternatively, the travel area DB 21, node DB 22, link DB 23, mobile unit DB 24, task DB 25, and operation schedule DB 26 may be stored in a server or the like that can communicate with the management device 100. In such a configuration, the management device 100 transmits and receives the necessary data to and from the server by use of the communication device 104.

The instructions in the processing procedure of the above embodiment may be implemented based on a software program. A general-purpose computer system may store this program so that effects similar to the ones obtained by the aforementioned management device can be achieved by reading the program. The instructions described in the embodiment may be stored as a computer-executable program in a magnetic disk (e.g., flexible disk or hard disk), an optical disk (e.g., CD-ROM, CD-R, CD-RW, DVD-ROM, DVD+R, DVD+RW, or Blu-ray™ disc), a semiconductor memory, or any storage medium of a similar type. The storage medium may be of any type readable on a computer or an embedded system. By reading the program from this storage medium and implementing, based on the program, the instructions described in the program on the CPU, the computer can realize operations similar to those of the management device according to the embodiment. If the computer acquires or reads the program, the acquisition or reading may be performed via a network.

Furthermore, part of the processing of the present embodiment may be executed on an operating system (OS) running on a computer based on the instructions of a program installed from a storage medium into the computer or embedded system, database management software, or middleware (MW) such as a network.

The storage medium of the present embodiment is not limited to a medium provided independently from a computer or an embedded system, and the medium may include a storage medium that stores or temporarily stores a program by downloading it through a LAN or the Internet.

The storage medium is not limited to a single medium. The processing of the present embodiment is executed from multiple media, and the media may have any configuration.

The computer or embedded system according to the present embodiment may execute the processing based on the programs stored in the storage medium, and it may have a structure of a personal computer or a microcomputer, or a structure of a system in which multiple devices are mutually connected via a network.

The computer according to the present embodiment is not limited to a personal computer. The computer here refers to a computational processing device, a computer or a microcomputer included in the information processing device, and may collectively refer to any apparatus or device that can realize functions of the present embodiment by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A mobile unit management device comprising a processor with hardware, configured to:

generate an operation schedule of at least one mobile unit;

control an operation of the mobile unit based on the operation schedule;

upon a need arising for updating of the operation schedule, estimate a future position of the mobile unit based on an old operation schedule that has not yet been executed on the mobile unit;

generate a new operation schedule based on the future position;

integrate the old operation schedule and the new operation schedule into an integrated operation schedule; and control the operation of the mobile unit based on the integrated operation schedule, wherein the processor controls the operation of the mobile unit by transmitting control commands based on the operation schedule to the mobile unit, wherein the number of control commands transmitted at a time is predetermined, and the processor maintains, among first control commands generated based on the old operation schedule, a first control command which has not yet been transmitted to the mobile unit and is for moving the mobile unit to the future position, and updates a first control command for moving the mobile unit to a position after the future position to a second control command generated based on the new operation schedule.

2. The mobile unit management device according to claim 1, wherein

12 the processor estimates the future position based on a calculation time required for generation of the new operation schedule.

3. The mobile unit management device according to claim 2, wherein the processor estimates the calculation time based on at least one of the number of mobile units, the number of tasks of the mobile units, and the number of candidate arriving points.

4. The mobile unit management device according to claim 1, wherein the processor integrates the new operation schedule and the old operation schedule by adopting the old operation schedule from a current position of the mobile unit at a time of generating the new operation schedule to the future position and adopting the new operation schedule after the future position.

5. The mobile unit management device according to claim 1, wherein if the control commands based on the operation schedule are in series and of the same type, the processor controls the operation of the mobile unit by transmitting the control commands of the same type in series to the mobile unit, the number of control commands exceeding the predetermined number.

6. The mobile unit management device according to claim 1, wherein the processor controls the operation of the mobile unit by transmitting to the mobile unit the control commands up to a command for moving the mobile unit to the future position, during updating of the operation schedule.

7. The mobile unit management device according to claim 1, wherein the processor determines that updating of the operation schedule is required, upon addition of a new task for the mobile unit, upon completion of the operation of the mobile unit, upon a discrepancy observed between the operation schedule and an actual operation of the mobile unit, or upon occurrence of an abnormality.

8. A mobile unit management method comprising:

generating an operation schedule of at least one mobile unit;

controlling an operation of the mobile unit based on the operation schedule;

upon a need arising for updating the operation schedule, estimating a future position of the mobile unit based on an old operation schedule that has not yet been executed on the mobile unit;

generating a new operation schedule based on the future position;

integrating the old operation schedule and the new operation schedule into an integrated operation schedule; and controlling the operation of the mobile unit based on the integrated operation schedule, wherein the method further includes controlling the operation of the mobile unit by transmitting control commands based on the operation schedule to the mobile unit, wherein the number of control commands transmitted at a time is predetermined, and maintaining, among first control commands generated based on the old operation schedule, a first control command which has not yet been transmitted to the mobile unit and is for moving the mobile unit to the future position, and updating a first control command for moving the mobile unit to a position after the future position to a second control command generated based on the new operation schedule.

9. A non-transitory computer readable storage medium that stores a mobile unit management program that when executed causes a mobile unit management device to perform a method comprising:

generating an operation schedule of at least one mobile unit;

controlling an operation of the mobile unit based on the operation schedule;

upon a need arising for updating the operation schedule, estimating a future position of the mobile unit based on an old operation schedule that has not yet been executed on the mobile unit;

generating a new operation schedule based on the future position;

integrating the old operation schedule and the new operation schedule into an integrated operation schedule; and controlling the operation of the mobile unit based on the integrated operation schedule, wherein the method further includes controlling the operation of the mobile unit by transmitting control commands based on the operation schedule to the mobile unit, wherein the number of control commands transmitted at a time is predetermined, and maintaining, among first control commands generated based on the old operation schedule, a first control command which has not yet been transmitted to the mobile unit and is for moving the mobile unit to the future position, and updating a first control command for moving the mobile unit to a position after the future position to a second control command generated based on the new operation schedule.

* * * * *